(12) United States Patent  (10) Patent No.: US 9,614,884 B2
Brown et al.  (45) Date of Patent: *Apr. 4, 2017

(54) SYSTEM AND METHOD OF OPTIMIZING DIGITAL MEDIA PROCESSING IN A CARRIER GRADE WEB PORTAL ENVIRONMENT

(71) Applicant: INTERNATIONAL BUSINESS MACHINES CORPORATION, Armonk, NY (US)

(72) Inventors: Richard H. Brown, Otis Orchards, WA (US); Michael E. Piotrowski, Spokane, WA (US); Sri Ramanathan, Lutz, FL (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,588

(22) Filed: Oct. 16, 2014

(65) Prior Publication Data

US 2015/0039729 A1  Feb. 5, 2015

Related U.S. Application Data

(63) Continuation of application No. 12/421,270, filed on Apr. 9, 2009, now Pat. No. 8,892,631.

(51) Int. Cl.
*G06F 15/16* (2006.01)
*H04L 29/06* (2006.01)
(Continued)

(52) U.S. Cl.
CPC .............. *H04L 65/60* (2013.01); *G06F 21/10* (2013.01); *H04L 67/02* (2013.01); *H04L 67/1002* (2013.01); *H04L 67/1034* (2013.01); *H04L 67/2809* (2013.01); *G06F 2221/2119* (2013.01); *H04L 63/0236* (2013.01); *H04L 63/168* (2013.01)

(58) Field of Classification Search
None
See application file for complete search history.

(56) References Cited

U.S. PATENT DOCUMENTS

5,751,956 A  5/1998  Kirsch
6,314,456 B1  11/2001  Van Andel et al.
(Continued)

*Primary Examiner* — Mohamed Ibrahim
(74) *Attorney, Agent, or Firm* — Christopher K. Mclane; Andrew M. Calderon; Roberts Mlotkowski Safran, Cole & Calderon, P.C.

(57) ABSTRACT

A computer implemented method includes storing generated digital media created by each portal server of a plurality of portal servers in a destination accessible by at least one of a plurality of HTTPD servers in response to a request for web content including the generated digital media. Additionally, the method includes determining that a subsequent request for digital media received by an HTTPD server of the plurality of HTTPD servers is for generated digital media created by any of the plurality of portal servers in the destination and accessible by the HTTPD server. Furthermore, the method includes serving the generated digital media from the HTTPD server to a browser.

20 Claims, 5 Drawing Sheets

(51) Int. Cl.
    *G06F 21/10*     (2013.01)
    *H04L 29/08*     (2006.01)

(56) References Cited

U.S. PATENT DOCUMENTS

| | | | |
|---|---|---|---|
| 6,351,767 | B1 | 2/2002 | Batchelder et al. |
| 6,466,966 | B1 | 10/2002 | Kirsch et al. |
| 7,269,664 | B2 | 9/2007 | Hutsch et al. |
| 7,277,924 | B1 * | 10/2007 | Wichmann et al. .......... 709/217 |
| 7,308,488 | B2 | 12/2007 | Doyle et al. |
| 7,376,739 | B2 | 5/2008 | Ramaswamy et al. |
| 7,565,399 | B1 | 7/2009 | Goel |
| 7,725,588 | B2 | 5/2010 | Yamakawa et al. |
| 7,827,298 | B2 * | 11/2010 | Black et al. ................... 709/231 |
| 8,392,532 | B2 * | 3/2013 | Wood et al. ................... 709/219 |
| 2002/0138582 | A1 | 9/2002 | Chandra et al. |
| 2003/0135509 | A1 | 7/2003 | Davis et al. |
| 2004/0019612 | A1 | 1/2004 | Tyra et al. |
| 2004/0044768 | A1 | 3/2004 | Takahashi |
| 2005/0094176 | A1 | 5/2005 | Matsuishi |
| 2006/0047661 | A1 | 3/2006 | Chowdhury et al. |
| 2006/0271705 | A1 | 11/2006 | Garcia-Luna-Aceves |
| 2008/0052548 | A1 | 2/2008 | Olsen et al. |
| 2008/0098101 | A1 | 4/2008 | Black et al. |
| 2009/0286513 | A1 | 11/2009 | Wilson et al. |
| 2009/0307603 | A1 * | 12/2009 | Gowda ............... H04L 67/2823 |
| | | | 715/749 |
| 2010/0131559 | A1 | 5/2010 | van Riel et al. |
| 2010/0132012 | A1 | 5/2010 | van Riel et al. |
| 2010/0162126 | A1 | 6/2010 | Donaldson et al. |
| 2012/0030309 | A1 * | 2/2012 | Onorato ............ G06F 17/30902 |
| | | | 709/217 |

* cited by examiner

SYSTEM AND METHOD OF OPTIMIZING DIGITAL MEDIA PROCESSING IN A CARRIER GRADE WEB PORTAL ENVIRONMENT

FIELD OF THE INVENTION

The present invention generally relates to a system and method of optimizing digital media processing, and more particularly, to a system and method of optimizing digital media processing in a carrier grade web portal environment to support cost effective scalability.

BACKGROUND

Carriers are facing a number of threats to their core business models. As part of their evolution, carriers have begun exploring ways of branching out from their core services (e.g., voice services, SMS, internet access, etc.) into new revenue generating business models including, for example, the deployment of visually rendered services. From a carrier's perspective, this trend, for example, has resulted in an increased focus on the roll out of rich web based applications that allow the carrier to be a participant of what is now a rapidly growing Web 2.0 ecosystem.

The term "Web 2.0" describes the changing trends in the use of World Wide Web technology and web design that aim to, for example, enhance creativity, communications, secure information sharing, collaboration and/or functionality of the web. Web 2.0 encapsulates the idea of the proliferation of interconnectivity and interactivity of web-delivered content. Web 2.0 concepts have led to the development and evolution of web culture communities and hosted services, such as, for example, social-networking sites, video sharing sites, wikis, blogs and folksonomies. Although the term Web 2.0 suggests a new version of the World Wide Web, it does not refer to an update to any technical specifications, but rather to changes in the ways software developers and end-users utilize the Web.

Web portals allow, for example, partners, employees and/or customers to choose their user experience, with personalized applications based on role, context, actions, location, preferences and team collaboration needs. A portal server comprises web portal software and core portal services that, e.g., aggregate applications and content as role-based applications.

Portlets are pluggable user interface software components that are managed and displayed in a web portal. Portlets produce fragments of markup code that are aggregated into a portal page. Typically, following the desktop metaphor, a portal page is displayed as a collection of non-overlapping portlet windows, where each portlet window displays a portlet. Hence a portlet (or collection of portlets) resembles a web-based application that is hosted in a portal. A portlet container is the runtime environment for portlets using the Java® Specification Request (JSR) 168 Portlet Specification, in which portlets are, for example, instantiated, used and destroyed. (Java and all Java-based trademarks and logos are trademarks of Sun Microsystems, Inc. in the United States, other countries, or both.) The JSR 168 Portlet application programming interface (API) provides standard interfaces for portlets. Portlets based on this JSR 168 Portlet Specification are referred to as standard portlets. Some examples of portlet applications are email, weather reports and discussion forums.

Portal based applications (or portlet applications) allow for web based applications to relatively easily provide personalization and customization features to subscribers so that, for example, content that is rendered by browsers is adapted as appropriate based on the preferences associated with a particular subscriber. Further, standards such as, for example, Java® Specification Request (JSR) 168, have allowed for portlet based infrastructures to become fairly widespread, allowing for the standards based development of standard portlets into standards-compliant portlet containers.

However, a number of challenges remain during the operational deployment of such a portal based solutions. For example, while achieving horizontal scalability is largely a function of adding capacity at multiple tiers, e.g., the HTTP (hypertext transfer protocol) Server tier, the portal tier and/or the database tier (assuming that the database is horizontally scalable) the costs associated with scaling at each these tiers are not equivalent. Additionally, for example, multiple types of digital media (inclusive of content that is rich (e.g., music and video)) are now being rendered to subscribers, increasing the importance of operational efficiency in these domains.

Accordingly, there exists a need in the art to overcome the deficiencies and limitations described hereinabove.

SUMMARY

In a first aspect of the invention, a computer implemented method comprises storing generated digital media created by each portal server of a plurality of portal servers in a destination accessible by at least one of a plurality of HTTPD servers in response to a request for web content including the generated digital media. Additionally, the method comprises determining that a subsequent request for digital media received by an HTTPD server of the plurality of HTTPD servers is for generated digital media created by any of the plurality of portal servers in the destination and accessible by the HTTPD server. Furthermore, the method comprises serving the generated digital media from the HTTPD server to a browser.

In another aspect of the invention, a system comprises a configuration tool operable to configure a plurality of portal servers and a plurality of HTTPD servers such that the plurality of portal servers are operable to store generated digital media in a destination accessible by at least one HTTPD server. Additionally, the configuration tool is operable to configure a plurality of portal servers and a plurality of HTTPD servers such that at least one HTTPD server of the plurality HTTPD servers is operable to access the destination containing the generated digital media and serve the generated digital media to a browser upon a request for the generated digital media.

In a further aspect of the invention, a system for optimizing digital media processing in a carrier grade web portal environment, comprises a switch configured to receive a request and a plurality of portal servers configured to generate digital media and store the generated digital media in a destination accessible by at least one of the plurality of HTTPD servers. Additionally, the system comprises a plurality of HTTPD servers configured to receive the request from the switch, fulfill a portion of the request by accessing the generated digital media from the destination and serving the generated digital media when available and forward a portal request to the at least one of the plurality of portal servers to fulfill a remainder of the request.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to a system and method of optimizing digital media processing, and more particularly, to a system and method of optimizing digital media processing in a carrier grade web portal environment to, for example, support cost effective scalability. In embodiments, the present invention provides a system and method of optimizing the delivery of generated or "computed" digital media content to browser-based subscribers (e.g., wireless subscribers and/or wired subscribers). More specifically, the present invention provides a digital media caching system and method for generated digital media, e.g., video, audio, images, icons, favicons, etc., (as opposed to caching entire pages) in a portal environment, where there is, for example, a significant amount of dynamically generated content.

That is, for example, in portal environments, the generated content may be dynamically changing, thus rendering caching of this dynamically generated content less useful. That is, if the generated content has changed since a previous request (and caching of the web page containing content), then a cached copy of the content will be out of date, and thus, not reusable.

In contrast, the generated digital media, e.g., static icons, may be less dynamic or static in the portal based application environment. For example, "static" icons are often based on trademarks, logos, or symbols. Uses of conventional "static" icons include, for example, display next to the page's title, shortcuts, URL bar decoration and/or browser bookmarks. Thus, in accordance with aspects of the invention, a caching system and method for the generated digital media may reduce regeneration of this generated digital media (and thus, cost) upon each request to a portal server.

Additionally, "favicons" describe highly dynamic media images computed from a per-user image based on the location of that image within the overall web page. For example, to avoid discontinuity between the computed favicon background and the web-page background a different color background is computed for the favicon depending on that icon's location. In this way, a distinct "favicon" is computed for each web page sent to the browser. Thus, while caching of favicons may be unproductive because they are typically used once and then discarded in embodiments, the present invention may be used to off-load computation of favicons to an HTTP server.

In embodiments, the present invention may be implemented using a set of extensions based on NFS, so that security, high availability, reliability and failover characteristics are supported in a clustered environment. In embodiments, the clustered environment may span multiple physical machines.

Moreover, the present invention is operable to support caching generated digital media on an HTTP tier so that the generated digital media can be significantly more efficiently accessed, without causing the portal servers to regenerate the generated digital media every time the content is accessed. For example, every additional piece of work that is done close to the core (e.g., away from the browser) not only adds CPU processing overhead, but also additional traffic and management overhead. Furthermore, in embodiments, the present invention provides: support for high availability, for example, load balancing and failover considerations, in a portal environment so that, for example, carrier grade deployment requirements can be fulfilled; adequate security considerations towards supporting implementation feasibility; and/or support for multiple vendor portal containers.

By implementing the present invention, cost savings can be realized, as it is more cost effective to fulfill as much of the communication traffic as close to the browser. For example, generally it can be far more cost effective to scale towards the edge, i.e., close to a browser, than it is to scale the application servers (e.g., portal servers) and the database tiers behind such servers. More specifically, implementing the present invention provides a highly cost effective mode of horizontal scalability wherein the HTTP tier is scaled out (where, for example, commodity hardware and/or licensing may be significantly lower). That is, the present invention realizes significant cost savings in carrier grade portal environments, e.g., in a carrier grade geo-distributed deployment, by allowing processing to happen up front on less expensive software and hardware.

As should be understood by those of ordinary skill in the art, security is an important issue that cannot be an afterthought and should be adequately considered for these types of deployments from the ground up to, for example, protect network elements in the call flow adequately. As such, in embodiments, implementing the present invention also is configured to provide firewall security. High availability and failover considerations are also important to the subscriber experience in any portal deployment. As such, the present invention also is configured to provide support for clustered application server environments, allowing for failover and fault tolerance. By clustering a portal application, it is possible to attain high availability and scalability for that application.

Furthermore, the present invention is configured to reduce latency. For example, the subscriber experience is directly dependent on latency and any approach of compressing latency should be given serious thought during the architecture design and implementation phases. In embodiments, the reduced latency may be proportional to the amount of generated content, for example, wherein higher amounts of generated content that is common to multiple subscribers (which is a very common scenario) provides more optimization.

In embodiments, for example, with the configuration-based implementation, the present invention provides support for multiple application server and portal environments. The present invention also provides support for expiring content, to optimize storage utilization.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
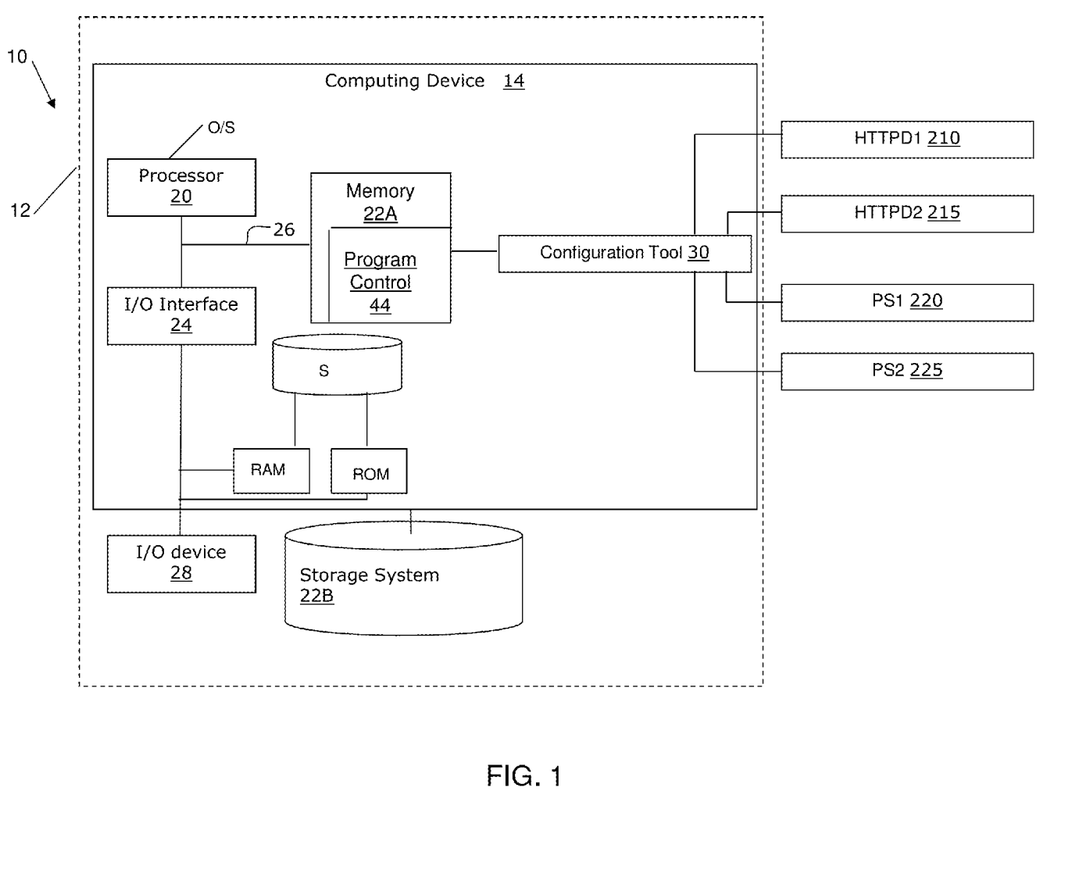
FIG. 1 shows an illustrative environment for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a configuration tool 30 operable to configure portal servers (e.g., PS1 220 and PS2 225) and/or HTTPD (web) servers (e.g., HTTPD1 210 and HTTPD2 215) to create directories (e.g., caches) for generated media accessible by the HTTPD servers in a portal environment, e.g., the processes described herein. The configuration tool 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls the configuration tool 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein, for example, on a subscription, advertising, and/or fee basis. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

First Exemplary Configuration

A portal server (e.g., in the subscriber interface layer) computes (or generates), for example, digital media images "on the fly" (or as needed) for inclusion into HTML served to browsers. In accordance with aspects of the invention, a caching mechanism for the generated digital media may reduce regeneration of this generated digital media (and thus, cost) upon each request to a portal server.

Viewing a Web page on the World Wide Web normally begins either by typing the URL of the page into a Web browser, or by following a hyperlink to that page or resource. For example, a client, e.g., the end-user makes a HTTP request using a user agent, e.g., a web browser, spider, or other end-user tool. The Web browser then initiates a series of communication messages, behind the scenes, in order to fetch and display the request. The responding server, or origin server, for example, stores and/or creates resources such as HTML files and images. In between the user agent and origin server may be several intermediaries, such as proxies, gateways, and tunnels communicating with the user agent and/or the origin server.

Web browsers communicate with Web servers primarily using HTTP (hypertext transfer protocol) to fetch webpages. HTTP allows Web browsers to submit information to Web servers as well as fetch Web pages from such servers. The browser requests the resource by sending an HTTP request to the Web server at that particular address. In the case of a typical Web page, the HTML text of the page is requested first and parsed immediately by the Web browser, which will then make additional requests for images and any other files that form a part of the page.

Having received the files from the Web server, the browser then renders the page onto the screen as specified by its HTML, CSS (cascading style sheets), and other Web languages. Any images and other resources are incorporated to produce the on-screen Web page that the user sees.

A portal server (e.g., in the subscriber interface layer) computes (or generates), for example, digital media images "on the fly" (or as needed) for inclusion into HTML served to browsers. These images, for example, the scaled and masked myFave images, e.g., favicons, may be incorporated via URLs into the portal's HTML. A browser later uses those URLs to retrieve the generated digital media, which are then rendered by the browser. The present invention provides a digital media caching model for generated digital media, e.g., favicons, images, video, etc., (as opposed to caching entire pages) in a portal environment, where there is, for example, a significant amount of dynamically generated content. Thus, in accordance with aspects of the invention, a caching mechanism for the generated digital media may reduce regeneration of this generated digital media (and thus, cost) upon each request to a portal server. Caching helps reduce the amount of communication traffic on the Internet. This helps reduce page download times and lowers demands on the servers.

Figure 2:
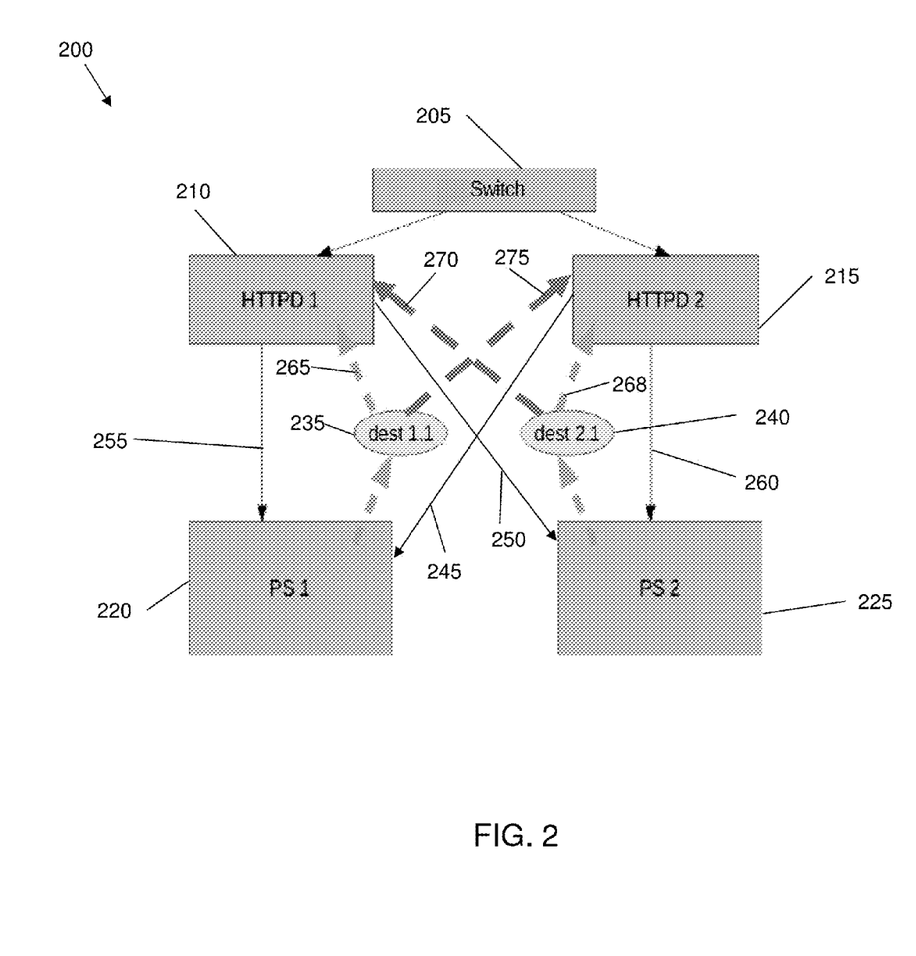
FIG. 2 shows an exemplary configuration in accordance with aspects of the invention.

FIG. 2 shows an exemplary configuration in accordance with aspects of the present invention to provide a caching mechanism for the generated digital media to reduce regeneration of this generated digital media by the portal server (and thus, cost) upon each request to a portal server. As shown in FIG. 2, a switch 205 (e.g., an F5 switch) receives a request (e.g., from a user or browser) and selects a web server (e.g., an HTTPD server), from amongst HTTPD1 210 and HTTPD2 215 (in this exemplary configuration) to handle each request. The HTTPD server (e.g., HTTPD1 210 or HTTPD2 215) forwards the request to one of several (for example, two as shown in FIG. 2) portal servers (e.g., PS1 220 and PS2 225). More specifically, HTTPD1 210 may forward the request. While only two portal servers are shown, the invention contemplates that more portal servers may be used in other configurations. The portal server (e.g., PS1 220 and/or PS2 225) computes the digital media (e.g., image, favicon, etc.) based on information from back-end services (not shown) and is configured to place the computed digital media file (without the dynamic web content) in a destination, or cache, (e.g., "dest 1.1" 235 for PS1 220 and/or "dest 2.1" 240 for PS2 225) that a web server (e.g., HTTPD1 210 and/or HTTPD2 215) is configured to later retrieve based on a URL constructed by that portal server (e.g., PS1 220 and/or PS2 225).

In accordance with aspects of the invention, as explained further below, the configuration tool 30 is operable to configure the HTTPD server (e.g., HTTPD1 210 and/or HTTPD2 215) to hand images back to a browser. As described above, an HTTPD server is a computer program (or the computer itself) that is, for example, responsible for accepting HTTP requests from clients (e.g., user agents such as web browsers), and serving the clients HTTP responses along with optional data contents, which usually are web pages such as HTML documents and linked objects (images, etc.). In accordance with aspects of the present invention, the configuration tool 30 is operable to configure the HTTPD server (e.g., HTTPD1 210 or HTTPD2 215), rather than a portal server, to serve images back to a browser. Additionally, in embodiments, the configuration tool 30 is operable to configure the HTTPD server to perform the computation of the digital media. Thus, for example, because portal server cycles are significantly more expensive than HTTPD server cycles due to, for example, the license costs of the portal server software, implementing the present invention realizes cost savings.

In embodiments, the configuration tool 30 is operable to configure the HTTPD servers (e.g., HTTPD1 210 and/or HTTPD2 215) and/or the portal servers (e.g., PS1 220 and/or PS2 225) for sharing a destination of the cached digital media, e.g., "dest 1.1" 235 of a portal server (e.g., PS1 220) amongst all of the HTTPD servers, or for not sharing a destination of the cached digital media of a portal server (e.g., PS1 220) amongst the HTTPD servers (e.g., HTTPD1 210 access the destination of the cached digital media of PS1 220 and HTTPD2 215 access the destination of the cached digital media of PS2 225).

Sharing the Generated Media Destination

In accordance with aspects of the invention, in embodiments, the generated media destination may be shared amongst the HTTPD servers. That is, as shown in the exemplary configuration of FIG. 2, "dest 1.1" 235 may be accessed by HTTPD1 210 via path 265 and "dest 2.1" 240 may be accessed by HTTPD2 215 via path 268. Additionally, with this exemplary "shared" configuration, "dest 1.1" 235 may be accessed by HTTPD2 215 via path 275 and "dest 2.1" 240 may be accessed by HTTPD1 210 via path 270.

Thus, in accordance with aspects of the invention, the configuration tool 30 is operable to configure a portal server (e.g., PS1 220 and/or PS2 225), such that the portal server writes the generated media files to a destination where the HTTPD server (e.g., HTTPD1 210 and HTTPD2 215) can access the generated image files. More specifically, the configuration tool 30 is operable to configure a networked file system and/or some file transfer protocol (e.g., FTP, SFTP, or equivalent) to move the media file from the portal server to the HTTPD server, as described further below. For example, under the Linux® operating system, both of these approaches are similar because Linux file systems are available that "wrap" file transfer protocols to produce network file systems. (Linux is a registered trademark of Linus Torvalds in the United States, other countries, or both.)

Configuring NFS Security

In accordance with further aspects of the invention, the configuration tool 30 may utilize Network File System protocol to configure the HTTPD servers (e.g., HTTPD1 210 and/or HTTPD2 215) and/or the portal servers (e.g., PS1 220 and/or PS2 225). A network file system is any computer file system that supports sharing of files, printers and other resources as persistent storage over a computer network. Network File System (NFS) protocol is a network file system protocol that, for example, allows a user on a client computer to access files over a network as easily as if the network devices were attached to its local disks. As discussed above, in embodiments, the configuration tool 30 is operable to use, for example, NFS extensions to control the caching of the generated digital media and access to the generated digital media.

Any security issues of NFS are minimized with the present invention. By way of example, in embodiments, it may be difficult to configure and maintain a multi-user wide-spread secure NFS system. For example, with NFS client access is determined by the userid/GUID of the client according to the server. Part of the complexity of managing large numbers of machines and/or users is preserving the userid/GUID correspondences between server and client.

In the context of operating systems, users are identified by an unsigned integer value called a user identifier, often abbreviated to UID or userid. A Globally Unique Identifier or GUID is a special type of identifier used in software applications in order to provide a reference number which is unique in any context (hence, "Globally"). For example, GUIDs may be used in defining the internal reference for a type of access point in a software application, or for creating unique keys in a database. While each generated GUID is not guaranteed to be unique, the total number of unique keys is so large that the probability of the same number being generated twice is very small.

As an example illustrating the difficulties of configuring and maintaining a multi-user wide-spread secure NFS system, assume a client user "httpuser" (with a userid "601") in default group "httpusergroup" (with a GUID "620") with the IDs in parenthesis. Because the NFS server's exported directory is writable by the server's user with userid (601), then "httpuser" on the client is able to write into the server's directory, which presents a security issue.

In view of the above, in accordance with aspects of the invention, for example, the configuration tool 30 is operable to configure an NFS system on an internal intranet (e.g., with a firewall blocking of all the NFS ports) among, for example, a small number of clients and servers for, e.g., a small number of user accounts. The first complexity is that NFS uses a number of daemons, each of which uses its own port. A daemon is a computer program that runs in the background (e.g., initiated as a background process), rather than under the direct control of a user. A port is a virtual data connection that can be used by programs to exchange data directly, instead of going through a file or other temporary storage location. The most common of these ports, for example, are transmission control protocol (TCP) ports and user datagram protocol (UDP) ports which are used, e.g., to exchange data between computers on the Internet. However, many of these ports "float" (that is, the port number is assigned randomly at runtime), which poses a problem for firewalls.

In accordance with aspects of the present invention, the configuration tool 30 is operable to configure the firewall to effectively pin down all of the daemons that are not pinned (that is, given a specific port) by default. For example, if loadable kernel modules (LKMs) are being used, the configuration tool 30 may configure the broadcast and listening ports in "/etc/modules.conf." (A LKM is an object file that contains code to extend the running kernel (or base kernel) of an operating system to, for example, add support for new hardware and/or filesystems, or for adding system calls.) In an exemplary embodiment, using LKMs, the configuration tool 30 may configure the broadcast and listening ports as follows:

portmap is always on port 111 TCP and UDP
nfsd is always on port 2049 TCP and UDP
statd floats
mountd floats
lockd floats With the described configuration there is no per-machine firewall. Rather, in accordance with aspects of the invention, the configuration tool 30 is operable to configure the firewall to protect the entire subnet by blocking all ports by default and only open those ports that are required. With the above example, since port 111, port 2049 and the floating ports are not among those required, they are blocked by the firewall. Therefore, in accordance with aspects of the invention, the configuration tool 30 may configure the firewall such that NFS security is aimed at access from the "trusted" network and is enforced, for example, by configuration files: "/etc/hosts.allow;" "/etc/hosts.deny;" and/or "/etc/exports." Thus, despite NFS security issues, the present invention is operable to utilize, for example, NFS to provide firewall protection.

Configuring Hosts and Exported Directories

In accordance with further aspects of the invention, the configuration tool 30 is operable to configure the network hosts and exports. In computer networking, a network host, Internet host or host is a computer connected to the Internet. A network host can host, for example, information as well as client and/or server software. Assuming, for example, that there are a small number of hosts (e.g., specifically 192.168.0.2 and 192.168.0.4) that should be allowed to access the secured NFS server, e.g., the portal server, the configuration tool 30 is operable to configure the contents for "/etc/hosts.deny" and "/etc/hosts.allow," for example, as follows to prevent any host other than specified hosts on the local area network from using NFS to access, e.g., the portal server.

/etc/hosts.deny portmap:ALL mountd:ALL rquotad:ALL statd:ALL lockd:ALL
/etc/hosts.allow portmap: 192.168.0.2 192.168.0.4 mountd: 192.168.0.2 192.168.0.4 rquotad: 192.168.0.2 192.168.0.4 statd: 192.168.0.2 192.168.0.4 lockd: 192.168.0.2 192.168.0.4

As shown, with the above exemplary configuration, all ports but the specified hosts (i.e., port 192.168.0.2 and port 192.168.0.4) are prevented from using NFS to access, e.g., the portal server.

Additionally, with the present invention, the configuration tool 30 is operable to establish, for example, a small number of exported directories. Additionally, in embodiments, these directories may be configured to contain the computed digital media, e.g., the favicon files. For example, the configuration tool 30 may utilize the following to export the directory "/opt/httpd/icons/generated."

/etc/exports
/opt/httpd/icons/generated 192.168.0.2(rw,sync) 192.168.0.4(rw,sync)

The options in parenthesis indicate that the directory is "read/write" accessible from a client. By default, an option "root_squash" is assumed, which maps a client root user (userid/GUID=0) to the server's anonymous account, thereby preventing a rogue client from being able to obtain root access to the server. In the "pull" configuration, described further below, only "read" access is required, so the "r" option rather than the "rw" option may be used.

It should be noted that, with this example, the only machines allowed access through NFS to the "/opt/httpd/icons/generated" directory are those machines with IP addresses 192.168.0.2 and 192.168.0.4. Furthermore, only specific user accounts have any access to the exported directory. However, since the server does not validate user identity, access from a compromised client is still possible. Nonetheless, because the shared directory only contains icon files which are accessible (through random file name generation) through HTTP from outside, with the present invention, any consequences of a security breach of this nature are clearly minimized. Furthermore, in embodiments, no application on the server or client executes any files in the exported directory or any subdirectory. That is, NSF does not allow access outside of the exported tree and, for example, symbolic links are not followed. Therefore, even if a hacker manages somehow to gain write access to the exported directory, nothing placed into that directory will cause any problems.

Destination "Push" Vs. "Pull"

In accordance with aspects of the invention, the configuration tool 30 is operable to configure a portal server (e.g., PS1 220 and/or PS2 225) to write generated media files, e.g., generated image files, favicons, etc., to a directory that is available to the HTTPD server(s) (e.g., HTTPD1 210 and/or HTTPD2 215). More specifically, in embodiments, the configuration tool 30 may configure the directory with the generated media files to be physically located on either a portal server (e.g., PS1 220 and/or PS2 225) or a HTTPD server (e.g., HTTPD1 210 and/or HTTPD2 215). For example, if the directory is physically located on a portal server, then the HTTPD server is operable to "pull" the generated media file over when it needs to serve it out to a browser. Conversely, if the directory is physically located on the HTTPD, the portal server (e.g., PS1 220 and/or PS2 225) is operable to "push" the generated media file over when it is created. Additionally, each portal server (e.g., PS1 220 and/or PS2 225) is configured (by the configuration tool 30) to clean up its own directory according to an icon time-to-live parameter.

Not Sharing the Generated Media Destination

In accordance with aspects of the invention, in embodiments, the generated media destination may be unshared amongst the HTTPD servers. That is, referring to the exemplary configuration of FIG. 2, "dest 1.1" 235 may be accessed by HTTPD1 210 via path 265 and "dest 2.1" 240 may be accessed by HTTPD2 215 via path 268. However, with an "unshared" configuration, "dest 1.1" 235 may not be accessed by HTTPD2 215 and "dest 2.1" 240 may not be accessed by HTTPD1 210. That is, with an unshared configuration, paths 270 and 275 would not be configured. Furthermore, with an unshared configuration, as the destination of PS2 225, e.g., "dest 2.1" 240 is not accessible by HTTPD1 210 and the destination of PS1 220, e.g., "dest 1.1" 235 is not accessible by HTTPD2 215, paths 245 and 250 may not be utilized.

Thus, in accordance with further aspects of the invention, the configuration tool 30 may configure the portal servers for not sharing the generated media destination. That is, in embodiments, the configuration tool 30 may configure the portal servers and the HTTPD servers, such that HTTPD1 210 can only access the generated media destination of PS1 220 and HTTPD2 215 can only access the generated media destination of PS2 225. As explained, the rationale for the HTTPD server running on a separate processor to serve the digital media generated by the portal server is to conserve cycles on the portal server. If moving the image takes about as many cycles as handling the HTTP image requests (typically there will be five such requests) and the switch 205 (e.g., an F5 switch) is configured for "session affinity" so that the digital media request can go to the portal server that produced the images, then, in accordance with aspects of the invention, the web application server (WAS) hosting portal server can also handle the image HTTP request. The configuration tool 30 may configure the HTTPD server (e.g., HTTPD1 210 and/or HTTPD2 215) to forward those requests in the same way the HTTPD server is configured to forward portal requests.

Exemplary Fail-Over Operation

Figure 3:
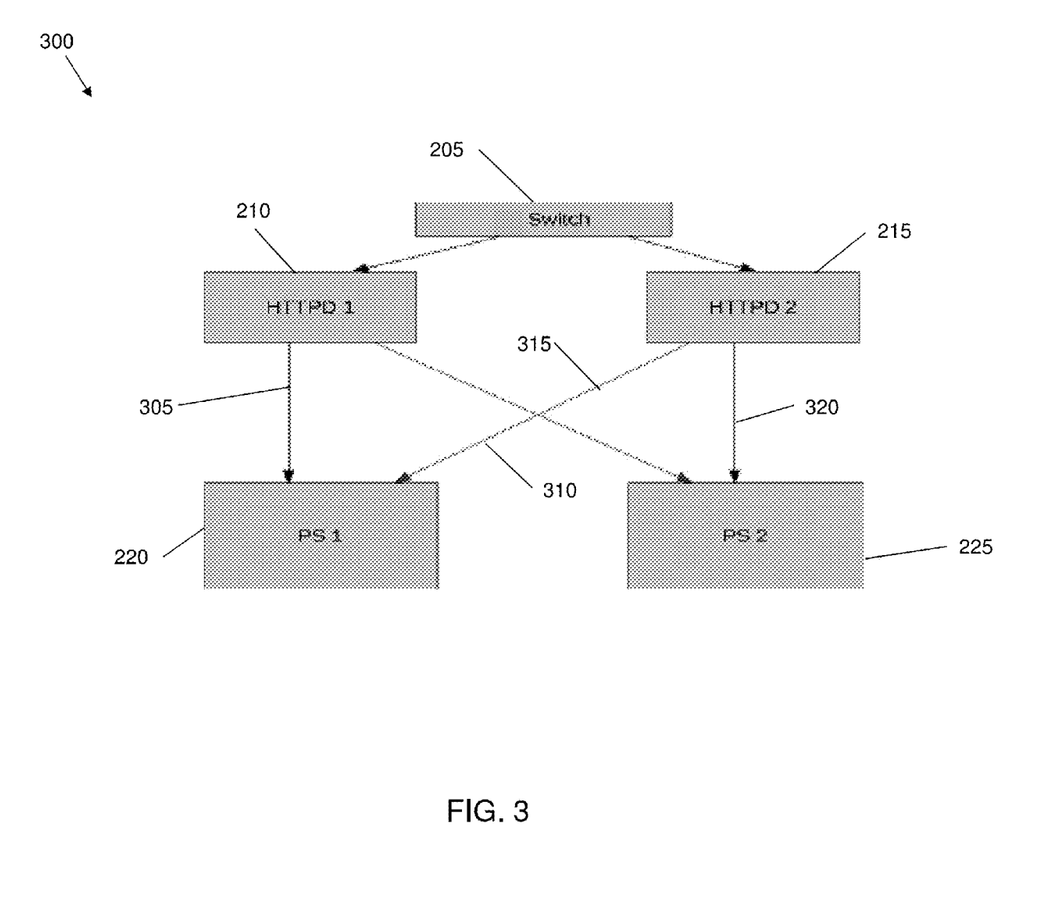
FIG. 3 shows an exemplary fail-over operation of the present invention to provide for high availability in accordance with aspects of the invention.

FIG. 3 shows an exemplary fail-over operation of the present invention to provide for high availability. As shown in FIG. 3, the exemplary fail-over operation is performed by a combination of the switch 205, e.g., an F5 switch, and HTTPD servers (HTTPD1 210 and HTTPD2 215). The switch 205 is operable to randomly forward requests to one of the HTTPD servers (e.g., HTTPD1 210 or HTTPD2 215) which, in turn, will forward portal requests to either PS1 220 (along paths 305 or 310, respectively) or backup PS2 225 (along paths 315 or 320, respectively).

With a fail-over, "the required time to live" or the time between the digital media (e.g., favicon) being written and the digital media being accessed by the browser, is expected to be a few seconds. These few seconds are the "critical window" in which a failure may occur, thus, for example, prompting a fail-over operation. Assume, for example, that PS1 220 responded to an initial request. Thus, PS1 220 generated the computed digital media (e.g., favicon) to a shared directory, e.g., physically located on PS1 220, which is readable by HTTPD1 210. The browser then uses the digital media's URL to retrieve that computed digital media.

Assuming both HTTPD1 210 and HTTPD2 215 are operational, the switch 205 (e.g., an F5 switch) will randomly pick one of the HTTPD servers to serve up the digital media. If HTTPD1 210 is unavailable, then HTTPD2 215 would receive the image request. In embodiments, the switch 205 may be configured for "session affinity," in which case, for example, HTTPD1 210 would normally receive the media request. If the switch 205 is configured for "session affinity," then in accordance with aspects of the present invention, either "push" or "pull" approach may be used to move the media file, for example, from PS1 220 to HTTPD1 210 (if available) or HTTPD2 215, otherwise.

However, in embodiments, without "session affinity," a "push" approach (e.g., wherein the directory is, for example, physically stored on the HTTPD servers) would require that PS1 220 write two copies of the generated digital media: one to a directory located on HTTPD1 210 and one to a directory located on HTTPD2 215. On the other hand, if a "pull" approach is used (e.g., wherein the directory is, for example, physically stored on the portal servers), the switch 205 need not be configured for "session affinity" because the digital media request will be processed by whichever HTTPD server by pulling digital media from the shared directory, e.g., physically located on PS1 220.

Second Exemplary Configuration

Figure 4:
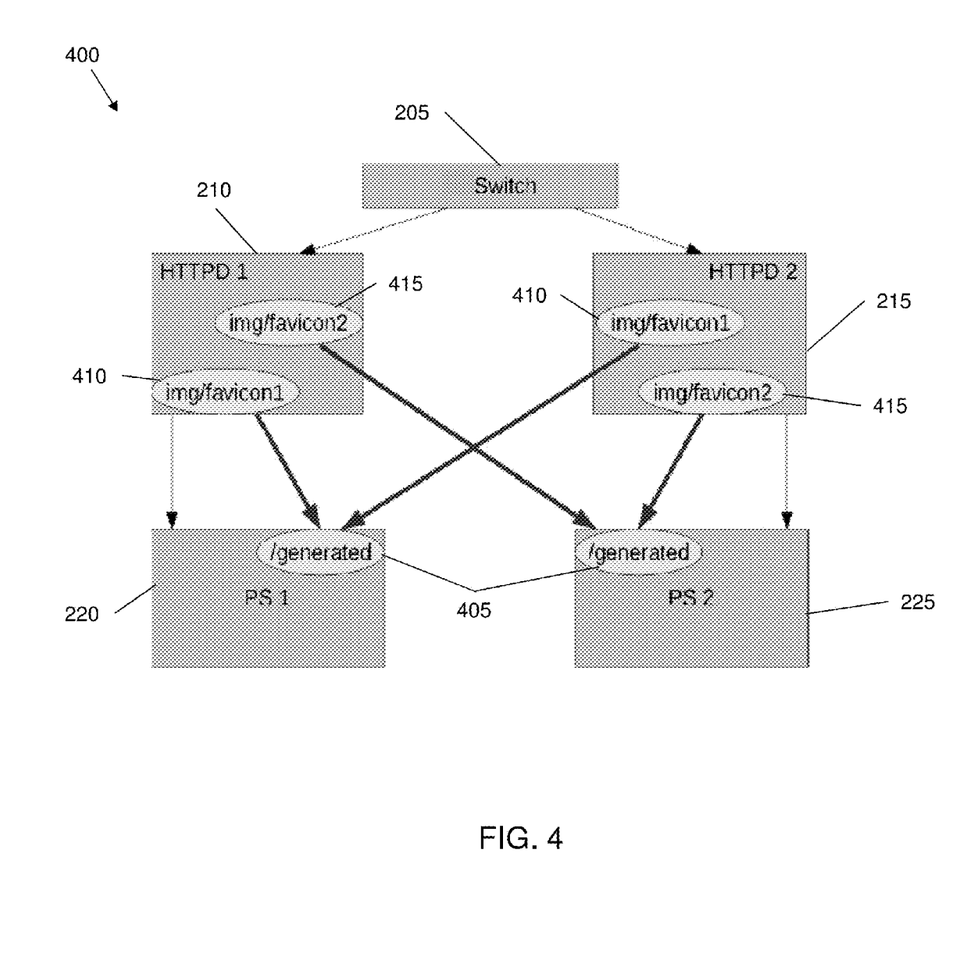
FIG. 4 shows an exemplary configuration in accordance with aspects of the invention.

FIG. 4 shows an exemplary configuration 400 in accordance with aspects of the invention. In this exemplary configuration 400, the configuration tool 30 has configured the portal server (e.g., PS1 220 and/or PS2 225) as an NFS server with "hosts.allow" configured to only permit access from the two HTTPD servers (HTTPD1 210 and HTTPD2 215). More specifically, as shown in FIG. 4, the configuration tool 30 has configured both PS1 220 and PS2 225 as NFS servers, such that each allows access only from HTTPD1 210 and HTTPD2 215 and each of PS1 220 and PS2 225 exposes a destination directory "/generated" 405. (It should be noted that there is no need for the destination directory to actually be a root directory.) With this exemplary configuration, the configuration tool 30 has configured HTTPD1 210 and HTTPD2 215 to each have entries in "/etc/hosts" to resolve PS1 220 and PS2 225 to the correct internet protocol (IP) addresses. Additionally, the configuration tool 30 is operable to configure the HTTPD's "/etc/fstab" files with lines such as, for example:

---
ps1:/generated /opt/IBMIHS/htdocs/en_US/my_faves/img/favicon1 nfs
ps2:/generated /opt/IBMIHS/htdocs/en_US/my_faves/img/favicon2 nfs
---

In accordance with aspects of the invention, these above lines use NFS to cross-link the file systems in a "pull" configuration as shown in FIG. 4.

Furthermore, in accordance with aspects of the present invention, the configuration tool 30 is operable to configure the portal server to back-end interface to generate the correct URLs for the generated digital media, e.g., icons, which are placed in the portal server's local "/generated" directory. For example, the configuration tool 30 may configure the portal server to back-end interface such that when PS1 220 generates, e.g., a favicon in a file named "/generated/Fav12345.png," PS1 220 will also generate the URL "http://portal.example.com/my_faves/img/favicon1/Fav12345.png" and return the URL to the browser (not shown). When the browser receives the URL from PS1 220, the switch 205, e.g., an F5 switch, selects one of HTTPD1 210 or HTTPD2 215. However, in either case, the HTTPD server (e.g., HTTPD1 210 or HTTPD2 215) accesses a directory remotely mounted to the PS1 220, which contains the generated media file. For example, the HTTPD server (e.g., HTTPD1 210 or HTTPD2 215) may access a directory "/opt/IHS/htdocs/en_US/my_faves/img/favicon1," which is remote mounted to the "/generated" directory of PS1 220.

The HTTPD server (e.g., HTTPD1 210 or HTTPD2 215) then pulls out "/generated/Fav12345.png" from PS1 220 and returns same to the browser. Additionally, as should be understood by those ordinarily skilled in the art, the same methodology may be used to access a generated media file, e.g., an icon, generated by PS2 225. That is, for example, the HTTPD server (e.g., HTTPD1 210 or HTTPD2 215) may access directory "/opt/IHS/htdocs/en_US/my_faves/img/favicon2," which is remote mounted to the "/generated" directory of PS2 225.

FIG. 4 also illustrates an exemplary fail-over operation in accordance with aspects of the invention. TABLE 1 illustrates exemplary fail-over scenarios and how the present invention is operable to provide for high availability. There is a window of vulnerability between the time that PS1 receives the initial request and the generated digital media, e.g., icon, is retrieved by the browser such that if PS1 fails during that window, the browser performs a page refresh. In embodiments, this window of vulnerability may last a few seconds.

TABLE 1

| When failure occurs | Change to scenario above |
|---|---|
| before PS1 220 generates icon | Either switch 205, e.g., an F5, or HTTPD1 210 will send request to PS2 225. Then PS2 225 returns a URL . . . /favicon2/Fav12345.png. Either HTTPD1 210 or HTTPD2 215 will retrieve that URL's file from PS2 225. |
| after initial PS1 220 request but before icon can be written | PS1 220 would fail mid-request. The browser would need to "refresh" the page, which leads to the "before PS1 220 generates" scenario above. |
| PS1 220 fails after icon written but prior to retrieval | HTTPD1 210 would not be able to retrieve the icon file. The browser would need to "refresh" the page, which leads to the "before PS1 220 generates" scenario above. |
| HTTPD1 210 fails after sending initial PS1 220 request but prior to receiving PS1 220 initial response | Browser hangs and would need to "refresh" the page. F5 would send the request to HTTPD2 215, which would in turn may the request to either PS1 220 or PS2 225. |
| HTTPD1 210 fails after icon written but prior to retrieval | Switch 205 sends request to HTTPD2 215, which retrieves the icon file from PS1 220. |
| failure after icon retrieval | no effect. Note: generated directory clean up occurs when the portal server starts and then according to time-to-live. |

Fuse-Based File Systems

While the present invention has been described above using NSF file system protocol, the invention contemplates that other file system protocols may be used, e.g., Linux FUSE-based file systems. Filesystem in Userspace (FUSE) is a loadable kernel module for Unix-like computer operating systems, that allows non-privileged users to create their own file systems without editing the kernel code. This is achieved by running the file system code in "user space," while the FUSE module only provides a "bridge" to the actual kernel interfaces.

Conventionally, file systems are built into the Linux kernel. If required, file systems can be compiled into the kernel itself, but more usually the file systems are compiled as loadable kernel modules (LKMs) that are then loaded or unloaded from the kernel at run-time. In both cases, the file system runs in "kernel space." However, in practice, running in kernel space has several disadvantages. For example, bugs can corrupt the operating system, forcing a re-boot. This is true for both "compiled in" modules and LKMs. Additionally, normal debugging tools cannot be used for kernel space and most subroutine libraries cannot be used in kernel space. A further disadvantage or running in kernel space is that security typically does not apply to kernel space programs In contrast, as explained above, FUSE (Filesystem in Userspace) is a Linux kernel module that can be used to run virtually all of a file system's implementation in "user space." In this configuration, utilizing user space, bugs typically do not corrupt the operating system (OS). Additionally, in user space, normal programming and development tools may be used. This makes FUSE-based file systems much easier to develop and safer to use.

In embodiments, the present invention may use FUSE-based file systems including, for example, Secure SHell FileSystem (SSHFS) and/or CURLFTPFS amongst other FUSE-based file systems. SSHFS is a file system for operating systems with a FUSE implementation capable of operating on files on a remote system, e.g., computer, using just a secure shell login on the remote system. SSHFS uses SFTP, the SSH File Transfer Protocol to put/get files on the remote system. SSH File Transfer Protocol (sometimes called Secure File Transfer Protocol or SFTP) is a network protocol that provides file transfer and manipulation functionality over any reliable data stream.

In accordance with aspects of the present invention, on the local system, e.g., computer, where the SSHFS is mounted, the present invention utilizes the FUSE (Filesystem in Userspace) kernel module, such that the end user can seamlessly interact with remote files being securely served over SSH just as if they were local files on the user's computer. On the remote computer, the SFTP subsystem of SSH is used. In embodiments, the portal server (PS) performs SSH encryption before the image file is transferred across SFTP.

Additionally, in embodiments, the present invention may use CURLFTPFS (or CurlFtpFS). CurlFtpFS is a filesystem for accessing FTP hosts based on FUSE and libcurl. Libcurl is a library/API that users may incorporate into their programs. Libcurl is used to provide URL transfer capabilities to numerous applications (e.g., open-source as well as proprietary). CURLFTPFS uses conventional FTP to put/get files on a remote system. Furthermore, as should be understood by those of ordinary skill in the art, the present invention may be utilized with any portal environment that generates, for example, a significant amount of generated digital media.

Flow Diagram

Figure 5:
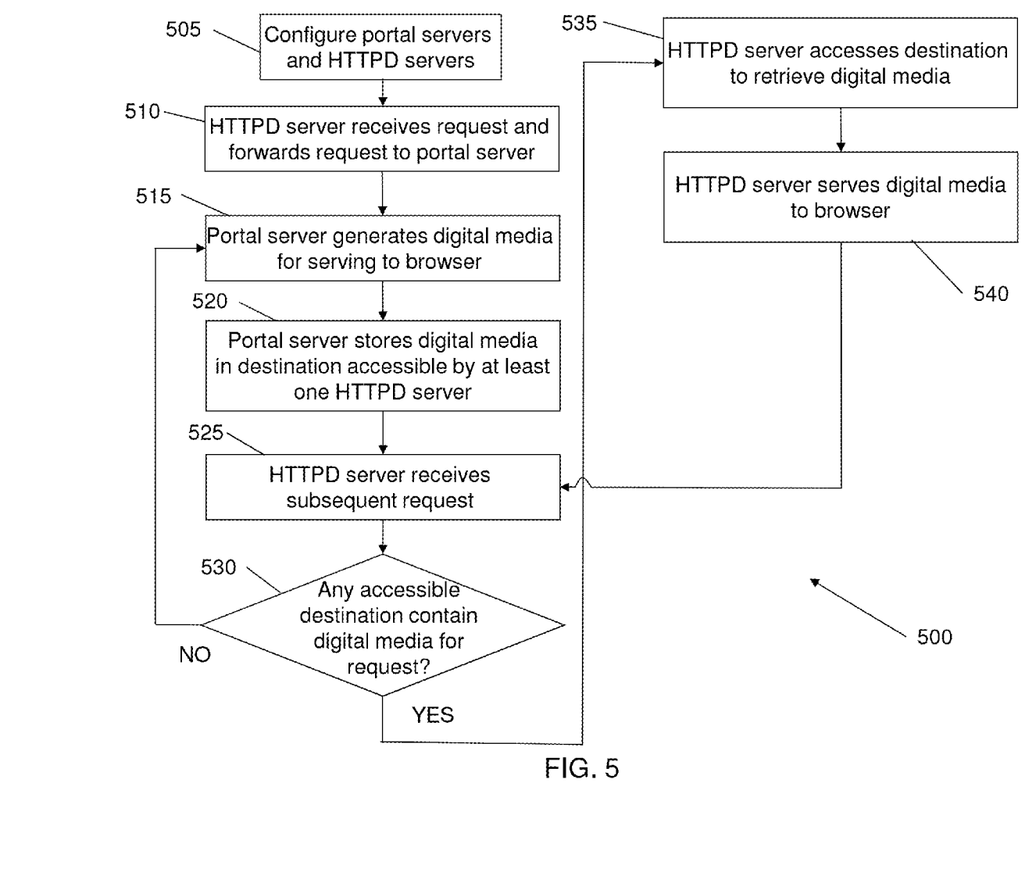
FIG. 5 shows an exemplary flow in accordance with aspects of the invention.

FIG. 5 shows an exemplary flow 500 for performing aspects of the present invention. The steps of FIG. 5 may be implemented in the environment of FIG. 1, for example. The flow diagram may equally represent a high-level block diagram of the invention. The flowchart and/or block diagram in FIG. 5 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 shows an exemplary flow 500 for optimizing digital media processing in a carrier grade web portal environment in accordance with aspects of the present invention. At step 505, the configuration tool configures the HTTPD servers and the portal servers. As discussed above, configuring the HTTPD servers and the portal servers includes configuring the portal servers to place generated digital media in a destination accessible by one or more of the HTTPD servers, configuring the HTTPD servers to access the destination of one or more portal servers, configuring the portal servers to limit access to a limited number of portal servers and/or IP addresses, amongst other configurations.

At step 510, an HTTPD server receives a request, for example, from a browser, e.g., for web page data, and forwards the request to a portal server. At step 515, the portal server serves the web page data including digital media to a browser based on the request. At step 520, the portal server stores the digital media in a destination accessible by at least one HTTPD server. At step 525, the HTTPD server receives a subsequent request for, e.g., web page data, including digital media.

At step 530, the HTTPD server determines whether any accessible destination of a portal server contains the digital media. If at step 530, the HTTPD server determines that an accessible destination of the portal server contains the digital media, the process proceeds to step 535. If, at step 530, the HTTPD server determines that no accessible destination of the portal servers contains the digital media, the process proceeds to step 515.

At step 535, the HTTPD server accesses the destination containing generated digital media. At step 540, the HTTPD server serves the generated digital media to the browser, and the process proceeds to step 525.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer implemented method comprising:
    storing digital media, without dynamic web content, in a destination accessible by at least one of a plurality of Hypertext Transfer Protocol Daemon (HTTPD) servers, wherein the storing comprises at least one of a plurality of portal servers storing the digital media in the destination;
    receiving a request for digital media at the at least one of the plurality of HTTPD servers;
    determining that the request received by the at least one of the plurality of HTTPD servers is:
        for the digital media stored in the destination by the at least one of the plurality of portal servers; and
        accessible by the at least one of the plurality of HTTPD servers;
    retrieving the digital media from the destination; and
    serving web page data and the digital media from the at least one of the plurality of HTTPD servers to a browser,
    wherein the at least one of the plurality of HTTPD servers is configured to perform a computation of the digital media and to serve the digital media to the browser.

2. The method of claim 1, wherein the destination is physically located at the at least one of the plurality of portal servers.

3. The method of claim 2, further comprising at least one of:
    the at least one of the plurality of portal servers pushing the digital media to the at least one of the plurality of HTTPD servers; and
    the at least one of the plurality of HTTPD servers pulling the digital media from the at least one of the plurality of portal servers.

4. The method of claim 1, wherein a service provider at least one of creates, maintains, deploys and supports a computer infrastructure which implements the computer implemented method on hardware or a combination of the hardware and software.

5. The method of claim 4, wherein the service provider at least one of creates, maintains, deploys and supports the computer infrastructure on a subscription and/or fee basis.

6. The method of claim 1, further comprising:
    determining that the request for the digital media received by the at least one of the plurality of HTTPD servers is not for the digital media in the destination;
    generating subsequent digital media at the at least one of the plurality of portal servers;
    serving the subsequent digital media to the browser; and
    storing the subsequent digital media in the destination.

7. The method of claim 1, wherein a switch transmits the request for the digital media received by the at least one of the plurality of HTTPD servers.

8. The method of claim 1, wherein the plurality of HTTPD servers comprises two HTTPD servers.

9. The method of claim 1, wherein the plurality of portal servers comprises two portal servers.

10. The method of claim 1, further comprising using network file system (NFS) protocol to store the digital media in the destination accessible by the at least one of the plurality of HTTPD servers.

11. The method of claim 1, further comprising at least one of:
    the at least one of the plurality of portal server pushing the digital media to the a least one of the plurality of HTTPD servers; and
    the at least one of the plurality of HTTPD servers pulling the digital media from the at least one of the plurality of portal servers,
    wherein the destination is physically located at the at least one of the plurality of HTTPD servers.

12. The method of claim 1, wherein the digital media comprises at least one of: an image; an icon; a favicon; video; and audio.

13. The method of claim 1, further comprising using a Filesystem in Userspace (FUSE)—based protocol to store the digital media in the destination accessible by the at least one of the plurality of HTTPD servers.

14. The method of claim 1, further comprising configuring the plurality of portal servers and the plurality of HTTPD servers to provide the accessibility by the at least one of the plurality of HTTPD servers to the destination.

15. The method of claim 1, wherein the method is implemented in a computer infrastructure having computer executable code tangibly embodied on a computer readable hardware storage device having programming instructions operable to perform the steps of claim 1.

16. A system, comprising:
a CPU, a computer readable memory and a computer readable storage media; and
program instructions to configure a plurality of portal servers and a plurality of HTTPD servers,
wherein:
at least one of the plurality of portal servers is configured to store digital media, without dynamic web content, in a destination accessible by at least one of the plurality of HTTPD servers, wherein the storing comprises the at least one of the plurality of portal servers storing the digital media in the destination;
the at least one of the plurality of HTTPD servers is configured to:
receive a request for digital media;
determine that the request received is:
for the digital media stored in the destination by the at least one of the plurality of portal servers; and
accessible by the at least one of the plurality of HTTPD servers; and
access the destination containing the digital media and serve web page data and the digital media to a browser; and
the program instructions are stored on the computer readable storage media for execution by the CPU via the computer readable memory, and
wherein the at least one of the plurality of HTTPD servers is configured to perform a computation of the digital media and to serve the digital media to the browser.

17. The system of claim 16, wherein the destination is physically located at the at least one of the plurality of portal servers.

18. The system of claim 16, wherein the destination is physically located at the at least one of the plurality of HTTPD servers.

19. The system of claim 16, wherein:
the plurality of portal servers and the plurality of HTTPD servers are configured with network file sharing (NFS) protocol; and
the digital media comprises at least one of: an image; an icon; a favicon; video; and audio.

20. A system for optimizing digital media processing in a carrier grade web portal environment, comprising:
a switch configured to receive and forward a request from a client;
a plurality of portal servers configured to:
aggregate applications and content as role-based applications; and
store the digital media, without dynamic web content, in a destination accessible by at least one of a plurality of HTTPD servers, wherein the storing comprises at least one of the plurality of portal servers storing the digital media in the destination; and
a plurality of web servers comprised of the plurality of HTTPD servers, and being configured to:
receive a request from the switch for web page data and digital media;
fulfill the digital media portion of the request by accessing the digital media from the destination and serving the digital media when available; and
forward a portal request to the at least one of the plurality of portal servers to fulfill the web page data portion of the request,
wherein the at least one of the plurality of HTTPD servers is configured to perform a computation of the digital media and to serve the digital media to a browser.

* * * * *